United States Patent
McGee et al.

[11] Patent Number: 6,025,059
[45] Date of Patent: Feb. 15, 2000

[54] COATED PLASTIC SUBSTRATES HAVING WET-SCRATCH RESISTANCE

[75] Inventors: Dennis E. McGee, Penfield; Gordon L. Musclow, Henrietta, both of N.Y.

[73] Assignee: Mobil Oil Corporation, Fairfax, Va.

[21] Appl. No.: 09/025,182

[22] Filed: Feb. 18, 1998

[51] Int. Cl.[7] ...................................... B32B 5/16
[52] U.S. Cl. .................. 428/219; 428/220; 428/323; 428/325; 428/328; 428/331; 428/333; 428/341; 428/474.4; 428/523
[58] Field of Search ..................... 428/219, 220, 428/323, 325, 328, 331, 333, 341, 480, 474.4, 523

[56] References Cited

U.S. PATENT DOCUMENTS

| | | |
|---|---|---|
| 3,719,629 | 3/1973 | Martin et al. . |
| 4,197,231 | 4/1980 | Braun ........................................ 523/457 |
| 4,206,097 | 6/1980 | Drawert et al. . |
| 4,214,039 | 7/1980 | Steiner et al. . |
| 4,343,641 | 8/1982 | Scholes ...................................... 65/60.2 |
| 4,374,879 | 2/1983 | Roberts et al. ............................. 428/35 |
| 4,632,869 | 12/1986 | Park et al. . |
| 4,698,396 | 10/1987 | Drawert et al. . |
| 4,857,568 | 8/1989 | Butters et al. . |
| 4,988,572 | 1/1991 | Butters et al. . |
| 5,030,496 | 7/1991 | McGurran .................................. 428/85 |
| 5,032,416 | 7/1991 | Niaura et al. ............................. 426/383 |
| 5,330,831 | 7/1994 | Knoerzer et al. ......................... 428/353 |
| 5,380,587 | 1/1995 | Musclow et al. . |
| 5,382,473 | 1/1995 | Musclow et al. . |
| 5,662,985 | 9/1997 | Jensen et al. ............................. 428/195 |
| 5,756,226 | 5/1998 | Valentini et al. ......................... 428/704 |
| 5,827,615 | 10/1998 | Touhsaent et al. ....................... 428/463 |

*Primary Examiner*—Hoa T. Le
*Attorney, Agent, or Firm*—Dennis P. Santini

[57] ABSTRACT

Printable, coated plastic substrates are disclosed. Plastic substrates are preferably films substrates, which when coated with an epoxy coating, optionally containing anti-abrasive particulate, provide excellent wet-scratch resistance and ink gloss. The epoxy coated plastic films are particularly suitable for use as printable labels.

25 Claims, 2 Drawing Sheets

COATED PLASTIC SUBSTRATES HAVING WET-SCRATCH RESISTANCE

FIELD OF THE INVENTION

The present invention relates to coated plastic substrates for printing applications, and more particularly to coated plastic films for printing applications.

BACKGROUND OF THE INVENTION

The development of commercially acceptable coated plastic films for printing applications, e.g., printable labels, is often a compromise between a variety of desired properties. One such requirement for coated plastic films is wet-scratch resistance, which is a primary concern in label applications. Other properties that coated plastic films for printing applications should provide are good graphics, ink gloss and short "tack up" times.

Unfortunately, coated plastic films that offer excellent print gloss, graphics and "tack up" times, normally exhibit poor wet-scratch resistance. Examples of commercially available plastic films that fall into this category are plastic films coated with acrylic polymers containing inorganic filler materials such as clay or talc (hereinafter "filled acrylic"). Moreover, such filled acrylic coatings are not clear. As a result, there are no clear coated lithographic films with excellent wet-scratch resistance available for use as printable labels.

The problem of wet-scratch resistance with the filled acrylic coated plastic films occurs when the coated film becomes exposed to water for more than five minutes. This frequently occurs when the plastic films are used as labels in bottling operations, in which the labels are applied to the bottles before filling and washing. The bottles, once filled and washed, are packaged and shipped within close proximity of each other and the packaging material. During shipment jostling of the packages occurs, which causes severe abrasion of the printed ink images on the labels. The abrasion eventually results in the ink being removed from the label and causing the final product to lose shelf appeal.

Attempts to counter the deficiency of filled acrylic coated films have resulted in other film structures being developed. Although these alternative printable films exhibit excellent wet-scratch resistance, they do so at the detriment of image graphics, ink gloss and tack up times as compared with the filled acrylic coated plastic films.

Thus, there is a need in the art for printable coated plastic films that exhibit wet-scratch resistance while at the same time providing the ink gloss, graphics and tack up times of the filled acrylic coated plastic films currently available in the market. Moreover, there is a need in the art for clear coated plastic labels having excellent wet-scratch resistance for printing applications, which presently are not commercially available.

Accordingly, it is an object of the present invention to provide printable coated plastic films that exhibit wet-scratch resistance while at the same time providing the ink gloss, graphics and tack up times comparable to filled acrylic coated plastic films. It is also an object of the present invention to clear coated plastic labels having excellent wet-scratch resistance for printing applications.

SUMMARY OF THE INVENTION

The present invention is a wet-scratch resistant plastic substrate suitable for receipt of an ink image. The plastic substrate has a printable layer of an epoxy coating containing the reaction product of an acidified aminoethylated vinyl polymer and an epoxy resin. The epoxy coating has a dry coating weight of at least 0.3 grams/1000 in$^2$, with at least 0.4 grams/1000 in$^2$ and 0.5 grams/1000 in$^2$ being more preferred.

The epoxy resin is preferably a glycidyl ether of a phenol, bisphenol, ring substituted bisphenol, resorcinol, hydroquinone, phenol formaldehyde novolac resin, polyoxypropylene glycol, ethylene glycol, propylene glycol, 1–4 butanediol, 1–6 hexanediol glycerol, glycol, lower alkyl substituted hydantoin or a mixture thereof More preferable, the above described epoxy resin has an epoxy equivalent weight from about 170 to about 280.

The acidified aminoethylated vinyl polymer is preferably a vinyl polymer having pendant amino alkylate groups of the following formula:

in which $R_1$ and $R_2$ are independently selected from the group consisting of hydrogen and lower alkyl radicals of one to our carbon atoms and the average value of n is from about 1.0 to about 2.5 and wherein the interpolymer before aminoethylation contains at least 3 percent by weight pendant—COOH Groups.

The plastic substrate is a preferably a thermoplastic film. Examples of thermoplastic films, include, but are not limited to, films formed from polyolefins, polyamides, polyesters, and polyethylene terephthalate. The thermoplastic film can be cavitated such as a cavitated polyolefin film, or clear (i.e., a non-cavitated film)

In a preferred embodiment, the epoxy coating has dispersed throughout an anti-abrasive particulate having a particle size greater than the thickness of the epoxy layer. Typically, the anti-abrasive particulate has a particle size greater than 1 micron. Examples of anti-abrasive particulate include, but are not limited to, silica, talc, clay, surface modified clay, surface modified silica, surface modified TiO$_2$ and mixtures thereof One particular preferred anti-abrasive particulate is silica, especially a silica having a water porosity less than three milliliters/gram.

In another preferred embodiment, the epoxy coating has dispersed throughout a small particulate filler having a particle size less than 1 micron to attenuate the gloss of the epoxy coating. Examples of small particulate filler include, but are not linited to, surface modified clay, surface modified silica, surface modified TiO$_2$ and mixtures thereof Preferably, in addition to the above described small particulate filler, the epoxy coating further contains an antistatic additive to improve sheeting operations. One preferred antistatic additive is a quaternary ammonium compound, such as poly(diallyldimethyl) ammonium chloride.

Optionally, the epoxy coating can include a secondary curing agent, such as poly(ethylenimine). A printable topcoat containing the anti-abrasive particulate can also be adhered to the epoxy layer, instead of dispersing the anti-abrasive particulate in the epoxy coating. An ink print image can be printed on the side of the epoxy coating opposite from the plastic substrate, or on the anti-abrasive topcoat adhered to the epoxy coating.

The present invention also provides a printed plastic film having wet scratch-resistance. The plastic film is formed from a thermoplastic such as polyolefins, polyamides, polyesters, or polyethylene terephthalate. The film has coated thereon a layer of an epoxy coating containing the reaction product of an acidified aminoethylated vinyl polymer and an epoxy resin, as previously described. An ink print image is printed on the surface of the epoxy coating opposite from the plastic film substrate.

As a result of the present invention, printable coated plastic substrates that exhibit excellent wet-scratch resistance, ink gloss and graphics have been developed. In particular, the present invention provides both clear and opaque printable films that, in addition to the above properties, do not exhibit destructive blocking when wound for storage.

DETAILED DESCRIPTION OF THE INVENTION

As previously described, the present invention is a plastic substrate having a layer of an epoxy coating that provides a surface for receipt of an ink print image. The epoxy layer of the present invention provides excellent wet-scratch resistance while at the same time affording the ink gloss, print image, and tack up times equivalent to, if not better than, those exhibited by plastic substrates coated with current filled acrylic polymers.

The epoxy coating (or epoxy binder) used to form the layer on the plastic substrate is the reaction product of an epoxy resin and an acidified aminoethylated vinyl polymer, which is used as a hardener or curing agent. A description of such epoxy coatings is found in U.S. Pat. No. 4,214,039 to Steiner et al., which is herein incorporated by reference.

The epoxy resin can be defined as glycidyl ethers of polyhydroxy compounds. Polyhydroxy compounds that can be used include, but are not limited to, bisphenol A (common name for 4,4'-isopropylidene bisphenol), ring substituted bisphenol A, resorcinol, hydroquinone, phenolformaldehyde novolac resins, aliphatic diols, such as ethylene glycol, propylene glycol, 1,4-butanediol, 1,6 hexanediol glycerol, poly(oxyethylene)glycol, poly(oxypropylene) glycol, and the like. One class of preferred epoxy resins are those based on bisphenol A.

The epoxy resins to be used are commonly classified by their epoxy equivalent weight (EEW), which is defined as the gram weight of resin that contains one gram equivalent of epoxy groups. Resins with an E.E.W. ranging from 170 to 280 can be used with the present invention, with resins having an E.E.W. of 180 to 210 being preferred.

Other types of epoxy resins based on aliphatic diols and having E.E.W.'s ranging from about 150 to about 380 can also be used in mixtures with bisphenol A resins where increased flexibility of the resulting layer is desired.

Although the specific structure of the epoxy resin is not critical to the epoxy coating, considerations in the selection of the epoxy resin revolve around its physical state. For example, the resin should be a liquid and capable of being readily dispersed or dissolved with the acidified aminoethylated vinyl polymer (i.e., hardener), which is as described below. If the epoxy resin is of low viscosity, it can be stirred directly into the hardener.

Preferably, the epoxy resin is dispersed in an aqueous emulsion for ease of handling. A commercially available emulsified epoxy resin is Daubond® 42X6311 from Daubond Chemical Company, Inc., in Chicago, Ill.

An alternative to emulsifiers is to substitute a hydantoin compound for bisphenol A. For example, 1,1-dimethyl hydantoin can be employed as a low molecular weight epoxy resin since resins based on this material are completely water soluble thereby eliminating the necessity for emulsification.

The liquid epoxy resin can be emulsified in a solution of hardener by rapid stirring, followed diluting the resultant dispersion with water to the desired solids concentration for use as the coating or binder. When a completely water soluble epoxy resin is employed, simple mixing of aqueous solutions of the resin and the hardener is sufficient to produce a clear, infinitely dilutable, coating solution. The solids content of the coating solution can range from about 2 up to about 35% solids, with 15 to about 30% solids be more preferred. Although it is difficult to obtain a stable dispersion at low concentrations since the epoxy resin tends to separate in large globules rather than remain in minute emulsified droplets, it has been found that usable products may be produced using this system.

A solid epoxy resin can be emulsified in water employing a non-ionic emulsifying agent. A stable, fine particle size emulsion containing about 50% epoxy resin may be readily prepared utilizing known prior art techniques. This emulsion may be subsequently stirred into the solution of the previously described hardener, either before or after dilution to the desired solids concentration, to form a stable dispersion.

The second component of the epoxy coating is the water soluble, acidified aminoethylated vinyl polymer, which is used as the hardener or primary curing agent. The preferred material is described in U.S. Pat. No. 3,719,629, which is incorporated herein by reference, and may be generically described as an acidified aminoethylated vinyl polymer having pendant amino alkylate groups of the general formula:

wherein $R_1$ and $R_2$ are hydrogen or lower alkyl radicals and the average value of n is in the range of about 1.0–2.5.

As described U.S. Pat. No. 3,719,629, the hardener is produced by polymerizing acrylate, methacrylate, styrene or other suitable monomers with sufficient methacrylic or acrylic acid to give a —COOH content of about 7.5 to about 12.5%. Solvent polymerization techniques are preferred. The polymer is thereafter reacted with an ethylene imine monomer and acidified with hydrochloric acid to render the polymer water soluble. A commercially available epoxy hardener is NK-7000, manufactured by Nippon Shokubai Co., Ltd., in Tokyo, Japan. The hardener contains approximately 50% resin in an ether/water solvent system. The resin has an amine hydrogen equivalent weight of between 350 and 450. This clear viscous solution is capable of being diluted infinitely with water.

When mixing the epoxy resin with the hardener, it is generally preferred to use a stoichiometric equivalent balance of epoxy and amine groups. However, the stoichiometric ratio can be varied over a wide range, from about 1 epoxy to about 3 amine through 3 epoxy to 1 amine, with about 1 epoxy to 2 amine through about 2 epoxy to 1 amine being more preferred. The actual stoichiometric ratio does not seriously affect the product's usefulness.

The epoxy binder can also contain various wetting aids and secondary curing agents. For example, the solution or dispersion of epoxy resin and hardener when applied to the substrate may not "wetout" uniformly, especially when such materials are applied in very thin layers. As a result, the dry but as yet uncured liquid mixture may retract into droplets or "islands."

To improve the "wet-out" of the coating, small amounts of wetting aid from 0.5 up to about 10% by weight of the total solids can be used. Any conventional non-ionic wetting agents can be employed. However, optimum results are obtained utilizing relatively high boiling point, i.e., —above 100° C., partially water-soluble organic compounds having hydrophilic groups attached to hydrophobic groups. Examples of such compounds include, but are not limited to, the hexyl or benzyl ether of ethylene glycol, the hexyl ether of diethyl glycol, butyl alcohol, hexyl alcohol, octyl alcohol, diacetone alcohol, and the like. One such preferred wetting aid is the hexyl ether of diethyl glycol also known as Hexyl Cellusolve, which is commercially available from Union Carbide.

A secondary curing agent can also be added to the binder in small amounts to enhance the rate of cure. Such curing agents can include, but are not limited to, propylene diamine, hexamethylene diamine, diethylene triamine, triethylamine, tetraethylene pentamine and the like. In addition, aliphatic polymeric amines can be employed such as poly(ethyleneimine) and poly(propyleneimine). Aromatic amines including tri(dimethyl aminomethyl) phenol can also be employed. Likewise, mixtures of the secondary curing agents can also be used.

A preferred secondary curing agent is poly(ethyleneimine). One such poly(ethyleneimine) resin commercially available is EPOMIN™ P-1050 available from Nippon Shokubia Co., Ltd., located in Tokyo, Japan. The EPOMIN™ resins contain a semi-linear polymer having branched chains of primary, secondary and tertiary amines. The P-1050 grade resin is a clear viscous liquid containing 50 wt. % resin The secondary curing agent can be employed in a ratio of 0.5 to 15 parts per 100 parts of dry epoxy resin. The advantage attained by use of a secondary curing catalyst is quicker attainment of moisture resistance.

In a preferred embodiment of the present invention, an anti-abrasive particulate is added to the epoxy binder prior to coating. The anti-abrasive particulate, although not required, increases the maximum wet-scratch resistance of the printable epoxy coating. This observation is contrary to the conventional acrylic polymer coatings, which exhibit a dramatic decrease in wet-scratch resistance with the addition of the anti-abrasive particulate.

The anti-abrasive particulate, at a minimum, should have a particle size greater than the thickness of the epoxy coating. While not wishing to be bound by theory, it is believed that particles having a particle size greater than the coating's thickness provide a "ball bearing" effect that further increases the wet-scratch resistance of the epoxy coating. The ball bearing effect results from the embedded anti-abrasive particulate protruding from the epoxy coating thereby providing a buffer between the ink print and any abrading surface. Thus, the ink print image remains protected while the protruding anti-abrasive particulate is eroded. The anti-abrasive particulate should have a particle size of at least 1 micron, with 2 microns being preferred, and 3 microns be more preferred. The maximum size of the anti-abrasive particulate should not exceed 25 microns, with no more 15 microns being preferred and no more 8 microns being more preferred.

In order to attenuate the surface gloss of the coated substrate to provide a satin to matte-like finish, a filler material having a small particle size is generally used in addition to the anti-abrasive particulate described above. The small particulate filler provides a matte-like finish to the epoxy coating, which is clear when unfilled, or contains the anti-abrasive particulate only. The small particulate filler allows for greater particle densities per square inch of coating thereby producing greater opacity and reduced gloss on clear and cavitated film substrates. The small particulate filler has a particle size less than 1 micron, with less than 0.8 microns being more preferred. However, particles less than 0.05 microns are not preferred since they will have a minimal effect on opacity and gloss. Alternatively, the small particulate filler, in large quantities, can be used with or in lieu of the anti-abrasive particulate since the filler, unless ultra pure, will generally contain a population of particles having a particle size greater than 1 micron.

The actual amount of filler material to be incorporated into the epoxy coating is variable, with the specific finish of the coating being directly dependent on the amount and type of filler material used. All of these parameters can be easily ascertained by one skilled in the art. The anti-abrasive particulate is added per 100 parts binder at minimum level of about 1 phr, with about 3 phr being preferred, and about 5 phr being more preferred. Maximum levels of anti-abrasive particulate per 100 parts binder should not exceed more than about 30 phr, with no more than about 15 phr being preferred and no more than about 10 phr being more preferred. The increasing amounts of the anti-abrasive particulate have been found to provide increased wet-scratch resistance, with a plateau effect occurring around 30 phr per 100 parts binder.

The small particulate filler is added per 100 parts binder, at minimum level of about 50 phr, with about 75 phr being preferred, and about 90 phr being more preferred. Maximum levels of small particulate filler material per 100 parts binder should not exceed more than about 300 phr, with no more than about 250 phr being preferred and no more than about 160 phr being more preferred.

The anti-abrasive particulate and the small particulate filler can be any conventional filler material used in printing applications. Examples of such materials include, but are not limited to, silica, clays, zinc oxide, tin oxide, talc, Tospearl™, surface modified clays, surface modified silicas and surface modified titanium dioxide ($TiO_2$). The filler materials are classified into two functional groups: hydrophillic fillers and hydrophobic fillers.

The hydrophillic fillers include silicas, clays, zinc oxide, tin oxide and talc. They are referred to as hydrophillic due to the ability to absorb water, which is measured by pore volume or porosity. The hydrophillic filler materials preferably have a low porosity or are non-porous. In the context of the present invention, low porosity means a porosity less than 3 milliliters/gram (ml/g), with less than 1.5 ml/g being preferred and less than 0.5 ml/g being more preferred. Low porosity and non-porous fillers have been found to provide the coated substrate with better overall properties than their more porous counterparts. A preferred low porosity filler is silica since they can be obtained in various grades of porosity and particle size, which makes them particularly suitable as anti-abrasive particulate. Examples of commercially available low porosity silicas are silica gels manufactured by Fuji Sylysia Chemical Company, under the tradename Sylysia™ and silica gels manufactured by Grace-Davison, under the tradenames Sylojet™, Syloid™.

The hydrophobic fillers include the surface modified clays, surface modified silicas and surface modified $TiO_2$, which have been rendered non-porous to water due to their surface modification with an organic moiety. Examples of surface modified clays include surface modified kaolinite clays sold under the tradename Kalophile-2™ by Dry Branch Kaolin and Lithoperse™7015 HS and 7005CS by Huber Engineered Minerals, and Kaopolite SFO from Kaopolite, Inc., which is no longer in production. A surface modified silica is AeroSil RX50 manufactured by Aerosil Nippon, located in Japan.

In accordance with the present invention, hydrophobic fillers are preferred since they allow for excellent wet-scratch resistance while providing excellent ink gloss and graphics. Hydrophobic fillers also appear to counter the detrimental effect that antistatic addditives (e.g., poly (diallyldimethyl) ammonium chloride) have on wet-scratch resistance exhibited by the unfilled epoxy coatings and the epoxy coatings containing hydrophillic filler only. Combinations of the hydrophobic and hydrophillic can also be used, and are even more preferred, since they further increase wet-scratch resistance. In fact, combinations of the two functional types of material (e.g., low porosity silica as the anti-abrasive at 10 parts per 100 parts binder, surface modified clay as the small particulate at 100 parts per 100 parts binder, and an antistatic additive at 9 parts per 100 parts binder) have resulted in printable films having a wet-scratch resistance of 1000+ strokes, while exhibiting good gloss and graphics.

The plastic substrate to be coated can be any thermoplastic material. Preferably, the plastic substrate is produced from a thermoplastic material, such as polyolefins, polyamides, polyesters, and polyethylene terephthalate. Examples of polyolefins to be used include α-olefins produced by Ziegler-Natta or metallocene catalysts, such as polyethylene, polypropylene, copolymers and terpolymers thereof Preferably, the substrate is a film since thermoplastic films coated with the epoxy coatings of the invention are particularly suitable for use as printable labels due to their excellent wet-scratch resistance, ink gross and print image. The films can be clear or cavitated structures, having one or several layers. Examples of film substrates particularly suitable for use are found in U.S. Pat. Nos. 5,382,473, 5,380,587 and 5,194,324, which are herein incorporated by reference. One preferred cavitated structure is a biaxially oriented cavitated polypropylene/polybutylene terephthalate film, disclosed in U.S. Pat. No. 4,632,869, which is herein incorporated by reference.

The actual thickness of the film is variable. For example, clear film substrates can have a thickness from 25 to 75 microns, with 35 to 55 microns being preferred. Cavitated (or opaque) film substrates can have a thickness from 50 to 250 microns, with 60 to 100 microns being preferred.

The epoxy binder is prepared by admixing the required amount of the emulsified epoxy resin to the hardener, which has been diluted with water to the desired concentration. Optional components such as secondary curing agents, wetting aids, anti-abrasive particulate and small particulate filler can also be added. The total solids concentration for the binder is generally dependent upon the coating application technique. In general, total solids concentrations of at least 5% up to about 35% are desirable, with 15% to 30% being more preferred.

The epoxy coating, filled or unfilled, is applied utilizing a standard coating technique to one or both sides of the substrate. An example of a coating process is gravure coating. The filled or unfilled coating can also be applied to the non-print surface of the substrate since it is usually more convenient to coat both sides, especially if the substrate is a film. In fact, coating of the non-print surface is preferred since it improves sheeting and print operations. However, for economic reasons, the coating on the non-print surface can also be thinner than the coating on the print surface.

The epoxy coating is applied to the substrate at a dry coating weight of at least 0.3 grams/1000 $in^2$ (g/msi). More preferable, a minimum coating weight of at least 0.4 to 0.5 g/msi is applied. A coating weight of at least 0.3 g/msi is preferred since it has been unexpectedly discovered that destructive blocking is dramatically minimized at this coating weight. Blocking is a particular problem since the coated film, prior to printing, is routinely wound in a roll for storage. Thus, the coated film adheres to itself and rips if blocking is not controlled. At coating weights higher than 0.3 g/msi (e.g., 0.6 or greater) blocking becomes so low that it is commercially unimportant since the films remain undamaged when unwound. This discovery was unexpected since blocking normally increases with greater coating weights and not the reverse. In accordance with the present invention, maximum coating weights of 3, 4, 5 g/msi or higher can easily be applied to the substrate.

The coated substrate is subsequently passed through a hot air oven to remove the water and solvent present. Residence times from 1 to about 10 seconds in the oven between 200°–250° F. are usually sufficient.

In order to provide printable labels, the non-print surface of the coated plastic substrate (i.e., the surface of the substrate opposite the epoxy coating) can be coated with various adhesives and have a releasable liner adhered thereon, or with antistatic coatings to improve machinability of coated substrates.

In an alternative embodiment of the present invention, a primer or functional layer can be applied to the plastic substrate prior to coating with the epoxy binder. Examples of the primer for thermoplastic materials include poly (ethyleneimine), which can be coextruded with or coated on the plastic substrate, and the epoxy coating at a low coating weight following the teaching of U.S. Pat. No. 4,214,409, to Steiner et al. Corona, plasma or flame treating can also be used with or instead of the primer. Functional layers can provide a barrier to gas and water vapor transmission. Materials to be used as the functional layer include, but are not limited to, poly(vinyl alcohol) and polyvinylidene chloride.

In another alternative embodiment, the anti-abrasive particulate is applied to the epoxy coating as a topcoat instead of being incorporated in the epoxy binder. For example, the particulate is dispersed in a suitable carrier, e.g., Tospearl™ in water with a surfactant, and applied to the epoxy coated substrate by conventional coating techniques. The ink print image is then applied to the topcoat instead of the epoxy coating.

The ink print image can be applied to the coated substrate using any known printing process. Examples include, but are not limited to, lithographic, UV-screen and intaglio printing processes. Similarly, the choice of inks to be used is variable.

The following non-limiting examples illustrate to advantageous use of the above described epoxy coating for printable plastic films.

EXAMPLES

Test Methods

Wet-Scratch Resistance

A test apparatus was developed to ascertain the wet-scratch resistance of the coated films. The apparatus is a sled that has three coin-like edges on the bottom. Two "coins" had their edges aligned parallel to the scrubbing direction and in line with one another. The other coin was aligned perpendicular to the other two. When scrubbing, failures were usually seen with the perpendicular coin. The coins were made of steel and the sled weighed about 750 grams. A steel U-channel with a flat bottom was fashioned to keep the sled (~2" wide and 4" long) within 1/16 "of the same track (i.e., the U-channel is 2⅛" wide at the bottom) while the sample (about 10" long and 2" wide) is being scrubbed. The samples were soaked for 5 minutes before scrubbing, unless otherwise noted. The scrubbing was done by exerting force only on the sides of the sled (to make it slide back and forth). No pressure was exerted on the top of the sled. The sled was moved back and forth on a sample until the base sheet can be seen through the ink. Testing of samples with excellent scratch resistance was stopped at specified number of strokes and designated with a (+) to indicate that the samples were not near their failing point. Thus, a sample given a wet-scratch resistance of 300+ strokes was tested up to 300 strokes and gave no signs of potential failure, at which point the test was stopped.

A black ink (OS Label Lyte Process Black from Flint Inks) was used to determine wet-scratch resistance. Black ink is one of the most difficult colors for attaining good wet-scratch resistance. Moreover, the gloss of this ink shows a high sensitivity to changes in the print surface.

Determination of Tack Up Times

"Tack up times" (i.e., the time it takes lithographic inks to lose their tackiness) were estimated by applying ink from one "small hole" of a "Quickpeek"® lithographic hand proofer (made by Thwing-Albert Instrument Company). According to the manufacturer, when applied to a 2"×10" area, this amount of ink simulates a smooth-finish paper with a light ink lay down. Once inked, the samples were placed in an oven between 130°–140° F. for approximately 2 to 5 minutes. The samples were hung on a wall and periodically checked for loss of tackiness. Tack up times of less than 4 hours are considered commercially acceptable.

Determination of Ink Gloss and Graphics

The ink gloss of the inked samples was measured using a Glossguard® II 45° gloss meter, from Pacific Scientific, Silver Springs, Md. A reflection of 30% with the above described ink was considered "good." A reflection of greater than 35% was considered "excellent." Graphics were categorized as "good" if samples printed on a commercial press exhibited no ink bleed between colors, good definition of dots and good half tones.

Example 1

As a comparative example, a printable film utilizing an acrylic/filler coating was prepared. A cavitated base sheet (1.6 mil thick having cavitated polypropylene core with a polybutylene terephthalate cavitator, a medium density polyethylene skin on one side and a polypropylene homopolymer skin on the other side of the core) was coated on both sides with a poly(ethyleneimine) primer utilizing a gravure coater at a coating weight of 0.006 g/msi. The primed film was then coated on both sides with a filled acrylic coating, PD901C from Adhesive Systems, Inc., at a coating weight of about 2.5 g/msi. In this context the term "about", which is abbreviated by using a "~", means that a variation of ±0.05 g/msi can occur in the coating weight. The filled acrylic coating contained talc and clay as fillers, and acrylic and ethylene-acrylic copolymer resins, with the 1 to 2 parts filler per 1 part resin. The coated substrate was dried in the priming oven at 200°–250° F. from 3–10 seconds as it passed through the oven.

The samples of the coated film were inked with the hand proofer utilizing black ink in accordance with the manufacturers instructions. At various time frames, the inked samples were tested for loss of tackiness. The inked samples required between 3 and 4 hours to tack up. The inked samples also exhibited excellent gloss.

The inked samples were exposed to water for approximately five minutes and the wet-scratch resistance of the films was determined with the previously described sled. All of the tested samples never exceeded ten (10) strokes.

Example 2

A second comparative example was conducted utilizing an unfilled water-resistant, emulsified acrylic resin, XPD-2236, available from B.F. Goodrich. Two different base sheets were used:(1) a 1.9 mil clear film of a polypropylene core with ethylene propylene skin layers; and (2) the 1.6 mil cavitated film described in Example 1. Coatings were applied with 72 quad gravure coater at a coating weight of about 0.9 g/msi. The films were dried with an oven at 220° F. Once dried, samples of the coated films were inked with the hand proofer as set forth in Example 1. The inked samples required between 8 and 24 hours to tack up, which was unacceptable for printing applications. The inked samples, however, did exhibit good wet-scratch resistance by surviving 200 strokes with the test apparatus.

In order to reduce the tack up time, 5 phr Syloid 244 (pore volume of 1.6 ml/g, mean particle size of 3–8 microns) was added to the acrylic resin. Samples of the above described cavitated and clear films were coated at about 0.9 g/msi. The films were dried and inked as described above. The resulting tack up time was longer than 4 hours but significantly less than 24 hours. However, a dramatic decrease in the wet-scratch resistance was observed. Inked samples of both films failed the wet-scratch test after only 25 strokes. Thus, the acrylic resin when modified to provide acceptable tack up times did not provide wet-scratch resistance acceptable for printable labels.

Example 3

In accordance with the present invention, an epoxy coated film, without the large particulate anti-abrasive particulate, was prepared. The epoxy binder, designated "B1", was prepared by admixing the following components:

| Ingredient | Amount |
| --- | --- |
| Water | 462.6 g |
| Hexyl Cellusolve (wetting agent) | 21.5 g |
| 10% PEI (poly (ethylene imine) pH 6.8 | 41.0 g |
| Acidified Amino ethylene vinyl polymer/hardener (NSK-7000), 50% solids | 193.4 g |
| Emulsified Epoxy Resin (Daubond DC-492X 6311), 53% solids | 81.5 g |
| | 800 g |

The binder mixture was allowed to stir between 20 and 21 hours at ambient temperature. The binder exhibited a pot life of at least 7 days. The calculated solid content of binder was 18%.

Coatings were applied with a 130 quad gravure coater to the cavitated base sheet described in Example 1. The epoxy binder was applied to the cavitated base sheets at coating weights of about 0.1, 0.2 and 0.3 g/msi. The coated films took approximately 16 to 24 hours to cure (i.e., cross-link) at ambient temperature.

Samples of the coated films were then inked with black ink utilizing the hand proofer as in Example 1. Tack up times and wet-scratch resistance were assessed. The sample coated at about 0.1 g/msi tacked up within 2.5 hours and had a wet-scratch resistance of 153 strokes. The samples coated at about 0.2 and 0.3 g/msi tacked up within 2.5 and 2.0 hours, with wet-scratch resistance being 164 and 70 strokes, respectively. Thus, with the exception of the film coated at 0.3 g/msi, the films coated with the unfilled epoxy binder had a wet-scratch resistance more than 15 times greater than the filled acrylic films of Example 1. Moreover, all three films coated with the unfilled epoxy binder had tacked up times less than 3 hours.

Example 4

To determine the effect of the anti-abrasive particulate and other additives on the epoxy binder, variations of the binder "B1" were prepared and coated on the cavitated film described in Example 1. The additives incorporated to binder were one or all of the following: PVOH (poly(vinyl alcohol) manufactured by Hoechst/Celanese; PVP (poly (vinyl pyrrolidone) manufactured by BASF), 261RV (poly (diallyldimethyl) ammonium chloride manufactured by Calgon); and Syloid 244 (silica gel having a pore volume of 1.6 ml/gram and a mean particle size of 3–8 microns, manufactured by Grace-Davison).

The samples of the coated films were inked with the hand proofer utilizing black ink as described in Example 1. All of the test samples tacked up within 3 hours. A summary of the coating weights, ink gloss, wet-scratch resistance, surface resistance and additives is shown in Table 1. The inked film of Example 1 is also listed as a control.

TABLE 1

| Sample (g/msi) | 45° Gloss (Black Ink) | Wet-Scratch After 5 minutes (Strokes) | PF Resist. (Log Ohms) −72° F., 27% RH | Additives per 100 phr Binder |
| --- | --- | --- | --- | --- |
| TBDM21-14 (0.76) | 12.2 | 250+ | 16.7 | 10 phr PVOH (Mowiol 4-88) and 30 phr Syloid 244 |
| TBDM21-15 (0.72) | 15.9 | 250+ | 16.7 | 10 phr PVP-K90 and 30 phr Syloid 244 |
| TBDM21-16 (0.69) | 20.1 | 250+ | 15.7 | 25 phr Syloid 244 |
| TBDM21-17 (0.67) | 18.3 | 250+ | 15.2 | 10 phr 261 RV and 25 phr Syloid 244 |
| TBDM21-18 (0.59) | 15.7 | 250+ | 15.6 | 20 phr Syloid 244 |
| TBDM21-19 (0.86) | 27.0 | 250+ | 16.0 | 15 phr Syloid 244 |
| TBDM21-20 (0.81) | 38.2 | 250+ | 16.7 | 10 phr Syloid 244 |
| TBDM21-21 (0.92) | 34.2 | 250+ | 17.0 | 5 phr Syloid 244 |
| TBDM21-12 (0.69) | 5.2 | 250+ | 16.6 | 30 phr Syloid 244 |
| PD901C (~2.5) | 36.9 | ≦10 | 17.5 | Example 1 Coating |

Table 1 shows that the combination of the epoxy binder and silica provides excellent wet-scratch resistance to the inked films. All of the films coated with the silica-filled epoxy binder exhibited a wet-scratch resistance greater than 250 strokes. In fact, samples of TBDM21-21 that were sent to a commercial printer, and aged a few weeks after printing, exhibited a wet-scratch resistance of 500+ strokes. In addition, films coated with binder containing low amounts of silica (e.g., TBDM21-20 and TBDM21-21) an exhibited ink gloss equivalent to, if not better than, the ink gloss exhibited by the control of Example 1. Thus, Table 1 illustrates that polymeric films coated with a silica filled epoxy binder offer excellent wet-scratch resistance while providing, at a minimum, ink gloss comparable to the prior art films.

Example 5

Several coating runs were conducted to evaluate the effects of the differing grades of silica gels on wet-scratch resistance. Nineteen (19) samples of the cavitated film described in Example 1 were coated with the epoxy binder "B1" containing differing amounts of Sylojet P612 (porosity 1.2 ml/gram, mean particle size of 3–8 microns), Syloid 244 (porosity 1.6 ml/gram, mean particle size of 3–8 microns), and Sylojet P412 (porosity 2.1 ml/gram, mean particle size of 3–8 microns). The first 9 runs were coater with a 72 quad gravure coater, while the remaining 10 were coated with a 130 quad gravure coater. After 24 hours, the coated films were inked following the procedure of Example 1. The inked films tacked up within 3 hours and exhibited an ink gloss equivalent to, if not better than, the control sample of Example 1. A summary of coating weights, wet-scratch resistance, and silica levels is shown in Table 2. The effects of coating weight, silica type (i.e., porosity), silica levels and coating roughness on wet-scratch resistance were ascertained by regression analysis, and is graphically depicted in FIG. 1. Regression analysis of the effects of coating weight, silica type, silica levels and coating roughness on blocking of the uninked films is also shown in FIG. 2.

TABLE 2

| Sample (g/msi) | Wet-Scratch After 5 Minutes (Strokes) | Anti-Abrasive Silica per 100 phr Binder |
|---|---|---|
| LDM2-1 (~0.1) | 300 | 1 phr Sylojet P612 |
| LDM2-2 (~0.1) | 300 | 3 phr Syloid 244 |
| LDM2-3 (~0.1) | 300 | 5 phr Sylojet P412 |
| LDM2-4 (~0.2) | 300 | 1 phr Sylojet P612 |
| LDM2-5 (~0.2) | 300 | 3 phr Syloid 244 |
| LDM2-6 (~0.2) | 300 | 5 phr Syloet P412 |
| LDM2-7 (~0.3) | 300 | 3 phr Sylojet P612 |
| LDM2-8 (~0.3) | 300 | 5 phr Syloid 244 |
| LDM2-9 (~0.3) | 250 | 1 phr Sylojet P412 |
| LDM2-10 (~0.1) | 300 | 5 phr Sylojet P612 |
| LDM2-11 (~0.1) | 153 | 1 phr Syloid 244 |
| LDM2-12 (~0.1) | 234 | 3 phr Syloid P412 |
| LDM2-13 (~0.2) | 300 | 3 phr Sylojet P612 |
| LDM2-14 (~0.2) | 300 | 5 phr Syloid 244 |
| LDM2-15 (~0.2) | 75 | 1 phr Sylojet P412 |
| LDM2-16 (~0.3) | 46 | 5 phr Sylojet P612 |
| LDM2-17 (~0.3) | 260 | 1 phr Syloid 244 |
| LDM2-18 (~0.3) | 300 | 3 phr Sylojet P412 |
| LDM2-19 (~0.2) | 300 | 5 phr Syloid 244 |

Figure 1:
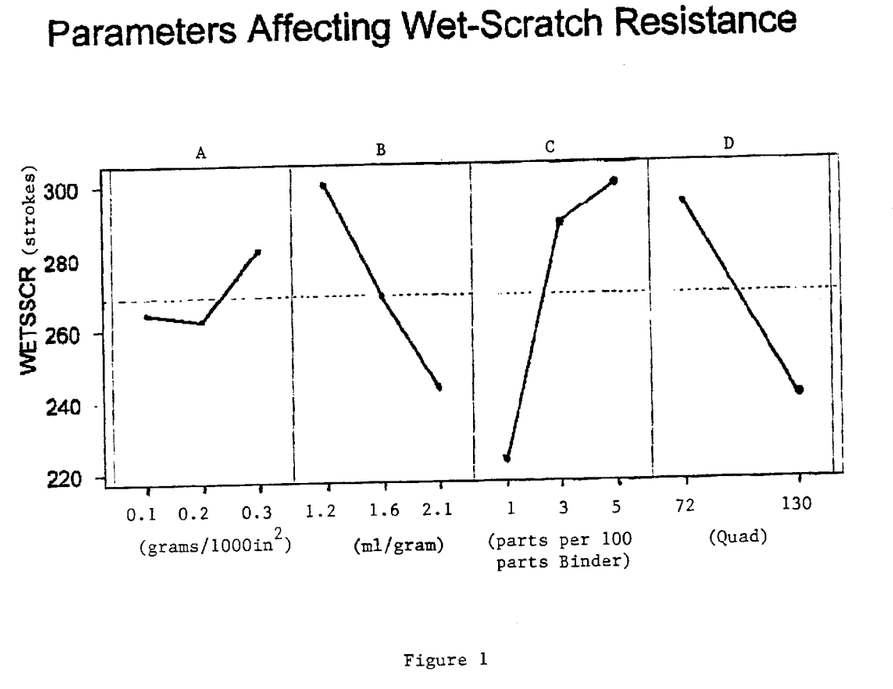
FIG. 1, panels A–D, are plot graphs of the effects of coating weight, porosity, particulate level and coating roughness, respectively, on the wet-scratch resistance exhibited by film substrates coated with an epoxy coating containing silica as an anti-abrasive particulate.
Figure 2:
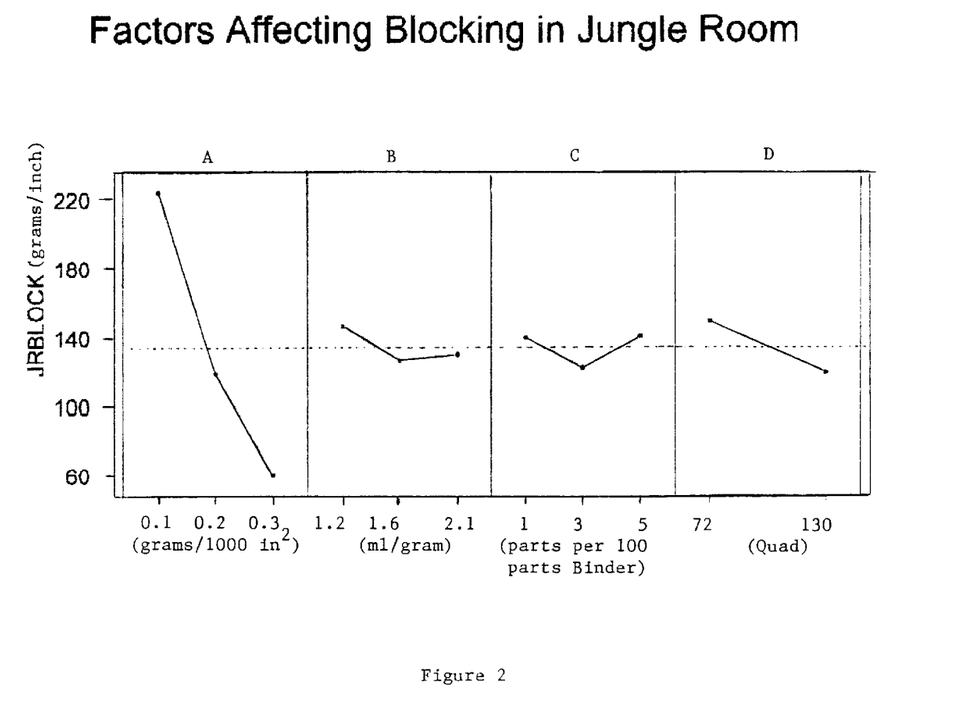
FIG. 2, panels A–D, are plot graphs of the effects of coating weight, porosity, particulate level and coating roughness, respectively, on blocking exhibited by film substrates coated with an epoxy coating containing silica as an anti-abrasive particulate, which were wound and stored under high humidity conditions.

FIG. 1 clearly demonstrates the effects of porosity and silica levels on wet-scratch resistance. The films coated with the binder containing the least porous silica, Sylojet P612 (1.2 ml/g), exhibited the highest wet-scratch resistance, 300+ strokes. FIG. 1 also shows that films coated with the binder containing the most silica (3 phr) exhibited the highest wet-scratch resistance, 300+ strokes. Of all the factors, coating weight had minimal effect on wet-scratch resistance. This observation was surprising since following conventional wisdom wet-scratch resistance increases with greater coating weights, which is normally observed with filled acrylic coatings.

However, more surprising was the regression analysis of the parameters affecting blocking of the coated films, which is shown in FIG. 2. Contrary to conventional teachings, the films coated with the heaviest coating weight, about 0.3 g/msi, had the lowest blocking values. For example, films having the lightest coating weight, about 0.1 g/msi, exhibited an average blocking value of 220 grams/inch after three days in a "jungle room"(95° F., 90% RH, 50 psi). To the contrary, films having the heaviest coating weight exhibited an average blocking value of 60 grams/inch, which was 3.7 times less than the films coated at 0.1 g/msi. In fact, blocking continues to decrease as the coating weight increases with no significant blocking occurring at coating weights of 0.5 g/msi or greater (data not shown).

Example 6

Samples of the cavitated film described in Example 1 were coated with an epoxy binder containing the hydrophobic surface modified clay, Kaopolite SFO, which is anhydrous aluminum silicate rendered hydrophobic (i.e., non-porous to water) by surface modification. The Kaopolite SFO has a mean particle size of 0.7 microns, and thus inherently contains a small percentage of particles of 1 micron and larger. The low porosity silica, Sylysia 730 (porosity 0.44 ml/g, mean particle size 3.0 microns), was added to the binder for some of the coating runs. The binder, designated "B2", was prepared by admixing the following components:

| Ingredient | Amount |
|---|---|
| Water | 522.9 g |
| Hexyl Cellusolve (wetting agent) | 32.8 g |
| 10% PEI (poly (ethylene imine) pH 6.8 | 32.3 g |
| Acidified Amino ethylene vinyl polymer/hardener (NSK-7000), 50% solids | 219.5 g |
| Emulsified Epoxy Resin (Daubond DC-492X 6311), 53% solids | 92.5 g |
| | 900 g |

Cavitated base sheets as described in Example 1 were coated with a 72 quad gravure coater. After minimum of 16–24 hours, the coated films were inked with a hand proofer utilizing black ink as described in Example 1. All of the test samples tacked up within 3 hours. A summary of the coating weights, ink gloss, wet-scratch resistance, surface resistance and additives is shown in Table 3.

TABLE 3

| Sample (g/msi) | 45° Gloss (Black Ink) | Wet-Scratch After 5 Min. (Strokes) | PF Resist. (Log Ohms) -72° F., 27% RH | Additives per 100 phr Binder |
|---|---|---|---|---|
| LDM5-1 (~0.9) | Not Measured | 400+ | Not Measured | 100 phr Kaopolite |
| LDM5-2 (~0.9) | Not Measured | 400+ | Not Measured | 100 phr Kaopolite and 10 phr Sylysia 730 |
| LDM5-3 (~4.6) | Not Measured | 400+ | Not Measured | 100 phr Kaopolite |
| LDM5-4 (~0.9) | 37.0% | 300+ | 15.1 | 100 phr Kaopolite |
| LDM5-5 (~0.9) | 37.9% | 300+ | 15.7 | 100 phr Kaopolite and 10 phr Sylysia 730 |
| LDM5-6 (~0.9) | 40.9% | 300+ | Not Measured | 50 phr Kaopolite |
| LDM5-7 (~0.9) | 35.3% | 300+ | Not Measured | 150 phr Kaopolite |
| LDM5-8 (~0.9) | 28.5% | 300+ | Not Measured | 50 phr kaopolite and 10 phr Sylysia 730 |
| LDM5-9 (~0.9) | 35.7% | 300+ | Not Measured | 150 phr kaopolite and 10 phr Sylysia 730 |
| LDM5-10 (~0.9) | 16.5% | 300+ | Not Measured | 100 phr Sylysia 730 |

Table 3 illustrates that the surface modified small particulate filler, which contains a small percentage of particles of 1 micron and larger, provides excellent ink gloss and wet-scratch resistance. In fact, the ink gloss exhibited by the surface modified fillers was better than the control of Example 1. For example, in LDM5-6, 50 parts Kaopolite SFO per 100 parts binder provided a wet-scratch resistance of 300+ and an ink gloss of 40.9%. Similarly, in LDM5-5, 100 parts Kaopolite SFO and 10 parts Sylysia 730 per 100 parts binder provided a wet-scratch resistance of 300+ strokes and an ink gloss of 37.9%. The control of Example 1, PD901C, exhibited a wet-scratch resistance less than 10 strokes and an ink gloss of only 36.9%.

While the invention has been described as to what are presently believed to be the preferred embodiments of the invention, those skilled in the art will realize the various changes and modifications which can be made to the invention without departing from the spirit of such invention. All such changes and modifications will fall within the scope of the present invention and are therefore intended to be claimed.

We claim:

1. A wet-scratch resistant plastic film, comprising:
   a plastic substrate;
   an epoxy coating containing the reaction product of an acidified aminoethylated vinyl polymer and an epoxy resin applied to the plastic substrate, wherein said epoxy coating has a dry coating weight of at least 0.3 grams/1000 in$^2$; and
   an ink print image on the side of said epoxy coating opposite from said plastic substrate.

2. The wet-scratch resistant plastic substrate according to claim 1, wherein said epoxy coating has dispersed therein an anti-abrasive particulate having a particle size greater than the thickness of said epoxy coating.

3. The wet-scratch resistant plastic substrate according to claim 2, wherein said anti-abrasive particulate has a particle size greater than 1 micron.

4. The wet-scratch resistant plastic substrate according to claim 2, wherein said anti-abrasive particulate is selected from the group consisting of silica, talc, clay, surface modified clay, surface modified silica, surface modified TiO$_2$ and mixtures thereof.

5. The wet-scratch resistant plastic substrate according to claim 4, wherein said anti-abrasive particulate is silica.

6. The wet-scratch resistant plastic substrate according to claim 5, wherein said silica has a water porosity less than 3 ml/gram.

7. The wet-scratch resistant plastic substrate according to claim 1, wherein said coating weight is at least 0.4 grams/ 1000 in$^2$.

8. The wet-scratch resistant plastic substrate according to claim 7, wherein said coating weight is at least 0.5 grams/ 1000 in$^2$.

9. The wet-scratch resistant plastic substrate according to claim 1, wherein said epoxy resin is a glycidyl ether of a member selected from the group consisting of phenols, bisphenols, ring substituted bisphenols, resorcinol, hydroquinone, phenol formaldehyde novolac resins, polyoxypropylene glycol, ethylene glycol, propylene glycol, 1-4 butanediol, 1-6 hexanediol glycerol, glycol, lower alkyl substituted hydantoin and mixtures thereof.

10. The wet-scratch resistant plastic substrate according to claim 9, wherein said epoxy resin has an epoxy equivalent weight from about 170 to about 280.

11. The wet-scratch resistant plastic substrate according to claim 1, wherein said acidified aminoethylated vinyl polymer has pendant amino alkylate groups of the following formula:

wherein R$_1$ and R$_2$ are independently selected from the group consisting of hydrogen and lower alkyl radicals of one to four carbon atoms and the average value of n is from about 1.0 to about 2.5 and wherein the interpolymer before aminoethylation contains at least 3 percent by weight pendant—COOH Groups.

12. The wet-scratch resistant plastic substrate according to claim 1, wherein said epoxy coating further comprises a secondary curing agent.

13. The wet-scratch resistant plastic substrate according to claim 12, wherein said secondary curing agent is poly (ethylenimnine).

14. The wet-scratch resistant plastic substrate according to claim 1, wherein said plastic substrate is a thermoplastic film.

15. The wet-scratch resistant plastic substrate according to claim 14, wherein said thermoplastic film is a film formed from a thermoplastic selected from the group consisting of polyolefins, polyamides, polyesters, and polyethylene terephthalate.

16. The wet-scratch resistant plastic substrate according to claim 14, wherein said thermoplastic film is a cavitated film.

17. The wet-scratch resistant plastic substrate according to claim 16, wherein said cavitated film is a cavitated polyolefin film.

18. The wet-scratch resistant plastic substrate according to claim 14, wherein said thermoplastic film is a clear film.

19. The wet-scratch resistant plastic substrate according to claim 1, further comprising a topcoat on said epoxy coating containing anti-abrasive particulate.

20. The wet-scratch resistant plastic substrate according to claim 1, wherein said epoxy coating has dispersed therein a small particulate filler having a particle size less than 1 micron, to attenuate surface gloss of said epoxy coating.

21. The wet-scratch resistant plastic substrate according to claim 20, wherein said small particulate filler is selected from the group consisting of surface modified clay, surface modified silica, surface modified TiO$_2$ and mixtures thereof.

22. The wet-scratch resistant plastic substrate according to claim 21, which further comprises an antistatic additive.

23. The wet-scratch resistant plastic substrate according to claim 22, wherein said antistatic additive is a quaternary ammonium compound.

24. The wet-scratch resistant plastic substrate according to claim 23, wherein said quaternary ammonium compound is poly(diallyldimethyl) ammonium chloride.

25. A printed plastic film having wet scratch-resistance comprising:
   a plastic film formed from a thermoplastic selected from the group consisting of polyolefins, polyamides, polyesters, and polyethylene terephthalate, having coated thereon a layer of an epoxy coating containing the reaction product of an acidified aminoethylated vinyl polymer and an epoxy resin; and
   an ink print image on the surface of said epoxy coating opposite said plastic film.

* * * * *